US012680467B2

(12) United States Patent
Asakawa

(10) Patent No.: US 12,680,467 B2
(45) Date of Patent: Jul. 14, 2026

(54) VARIABLE CAPACITY TURBOCHARGER

(71) Applicant: IHI Corporation, Tokyo (JP)

(72) Inventor: Takao Asakawa, Tokyo (JP)

( * ) Notice: Subject to any disclaimer, the term of this patent is extended or adjusted under 35 U.S.C. 154(b) by 0 days.

(21) Appl. No.: 19/056,765

(22) Filed: Feb. 19, 2025

(65) Prior Publication Data

US 2025/0188846 A1 Jun. 12, 2025

Related U.S. Application Data

(63) Continuation of application No. PCT/JP2023/027015, filed on Jul. 24, 2023.

(30) Foreign Application Priority Data

Oct. 5, 2022 (JP) ................................ 2022-160777

(51) Int. Cl.
*F01D 17/16* (2006.01)

(52) U.S. Cl.
CPC ........ *F01D 17/165* (2013.01); *F05D 2220/40* (2013.01); *F05D 2260/38* (2013.01); *F05D 2300/516* (2013.01)

(58) Field of Classification Search
CPC .......... F01D 17/165; F02B 37/24; F02C 6/12; F05D 2220/40; F05D 2260/38; F05D 2300/516; F05D 2240/15
See application file for complete search history.

(56) References Cited

U.S. PATENT DOCUMENTS

| | | | | |
|---|---|---|---|---|
| 8,662,833 | B2 * | 3/2014 | Wengert | F02C 6/12 415/206 |
| 9,163,557 | B2 * | 10/2015 | Blümmel | F02B 37/225 |
| 12,025,012 | B2 * | 7/2024 | Shimizu | F01D 15/08 |
| 12,203,378 | B2 * | 1/2025 | Asakawa | F01D 25/24 |
| 2018/0363493 | A1 | 12/2018 | Asakawa et al. | |
| 2019/0003337 | A1 | 1/2019 | Strauss | |
| 2021/0054783 | A1 * | 2/2021 | Weiß | F01D 17/165 |
| 2022/0010722 | A1 * | 1/2022 | Segawa | F02B 37/24 |

(Continued)

FOREIGN PATENT DOCUMENTS

| | | | | |
|---|---|---|---|---|
| DE | 102006062207 A1 * | 6/2008 | | B21H 1/18 |
| DE | 102018003239 A1 * | 10/2019 | | F01D 25/265 |

(Continued)

OTHER PUBLICATIONS

DE_102006062207_-_translated_spec (Year: 2008).*

(Continued)

*Primary Examiner* — Brian P Wolcott
(74) *Attorney, Agent, or Firm* — SHIPWAY IP

(57) ABSTRACT

An example turbocharger includes a turbine blade wheel, a housing including a flow path through which gas received from an inlet flows, and a variable capacity assembly disposed in the housing and configured to receive the gas from the flow path and guide the gas to the turbine blade wheel. The housing includes a housing contact surface that is in contact with the variable capacity assembly in an axial direction of a rotation axis of the turbine blade wheel. The housing includes a housing contact surface that is in contact with the housing contact surface in the axial direction. At least one of the housing contact surface and the assembly contact surface includes a high friction surface.

18 Claims, 4 Drawing Sheets

(56) References Cited

U.S. PATENT DOCUMENTS

2023/0160320 A1* 5/2023 Itou .......................... F02B 37/24
415/229
2023/0287798 A1 9/2023 Asakawa

FOREIGN PATENT DOCUMENTS

| | | |
|---|---|---|
| JP | 2009-062840 | 3/2009 |
| JP | 2019-505724 | 2/2019 |
| JP | 2021-528588 | 10/2021 |
| WO | 2017/144160 | 8/2017 |
| WO | 2017/150450 | 9/2017 |
| WO | 2020/001805 | 1/2020 |
| WO | 2020/202613 | 10/2020 |
| WO | 2022/054763 | 3/2022 |
| WO | 2022/113619 | 6/2022 |

OTHER PUBLICATIONS

DE_102018003239_-_translated_spec (Year: 2018).*
International Preliminary Report on Patentability with Written Opinion dated Apr. 17, 2025 for PCT/JP2023/027015.
International Search Report dated Aug. 29, 2023 for PCT/JP2023/027015.

* cited by examiner

VARIABLE CAPACITY TURBOCHARGER

CROSS-REFERENCE TO RELATED APPLICATIONS

This application is a continuation application of PCT Application No. PCT/JP2023/027015, filed on Jul. 24, 2023, which claims the benefit of priority from Japanese Patent Application No. 2022-160777, filed on Oct. 5, 2022. The entire contents of the above listed PCT and priority applications are incorporated herein by reference.

BACKGROUND

Field

The present disclosure relates to a turbocharger.

Description of the Related Art

International Publication No. 2017/150450 discloses a variable capacity turbocharger. A variable capacity turbocharger includes a variable capacity mechanism. The variable capacity mechanism changes gas flow path area using a plurality of nozzle vanes. As a result, flow velocity of gas supplied to a turbine blade wheel is controlled.

SUMMARY

Among a plurality of components constituting a turbocharger, components that are not intended to be driven are fixed so as not to move relative to one another. When the turbocharger is in an operating state, however, a degree of fixing might decrease due to an effect of thermal deformation of components and the like. As a result of the decrease in the degree of fixing, slight relative displacement between components might occur due to an external force acting from the outside.

The present disclosure describes a turbocharger capable of suppressing occurrence of slight relative displacement between components.

Disclosed herein is an example turbocharger including a turbine blade wheel, a first housing including a flow path through which gas received from an inlet flows, a variable capacity mechanism disposed in the first housing and configured to receive the gas from the flow path and guide the gas to the turbine blade wheel, and a biasing member configured to apply, to the variable capacity mechanism, a biasing force pressing the variable capacity mechanism against the first housing. The first housing may have a first housing contact surface in contact with the variable capacity mechanism in an axial direction of a rotation axis of the turbine blade wheel. The variable capacity mechanism may have a first variable capacity mechanism contact surface in contact with the first housing contact surface in the axial direction of the rotation axis. At least one of the first housing contact surface and the first variable capacity mechanism contact surface may be subjected to processing for increasing a friction coefficient.

DETAILED DESCRIPTION

Figure 1:
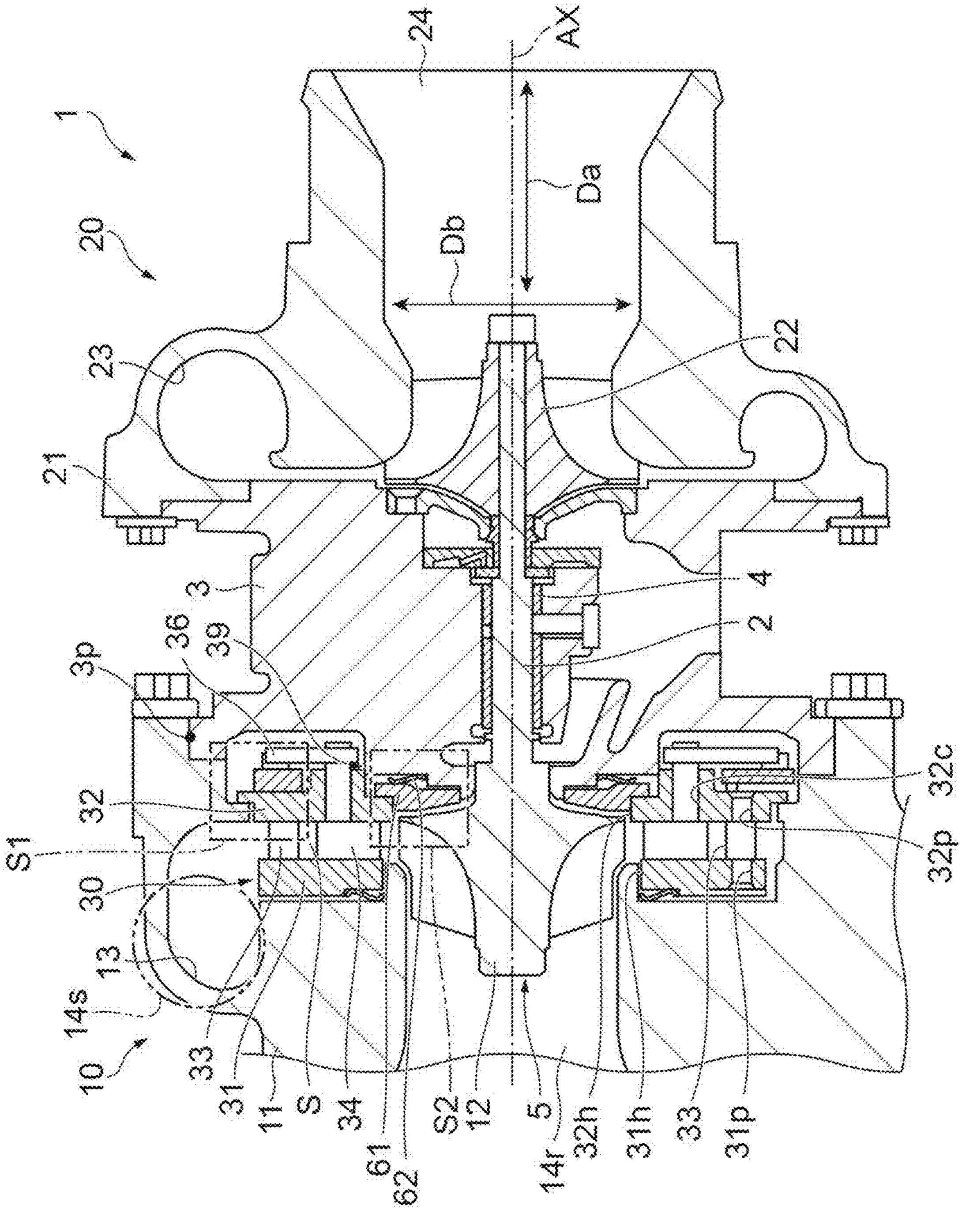
FIG. 1 is a cross-sectional view illustrating an example turbocharger.

In the following description, with reference to the drawings, the same reference numbers are assigned to the same components or to similar components having the same function, and overlapping description is omitted.

An example turbocharger may include a turbine blade wheel, a first housing including a flow path through which gas received from an inlet flows, a variable capacity mechanism disposed in the first housing and configured to receive the gas from the flow path and guide the gas to the turbine blade wheel, and a biasing member configured to apply, to the variable capacity mechanism, a biasing force pressing the variable capacity mechanism against the first housing. The first housing may have a first housing contact surface in contact with the variable capacity mechanism in an axial direction of a rotation axis of the turbine blade wheel. The variable capacity mechanism may have a first variable capacity mechanism contact surface in contact with the first housing contact surface in the axial direction of the rotation axis. At least one of the first housing contact surface and the first variable capacity mechanism contact surface may be subjected to processing for increasing a friction coefficient.

In a portion where the first housing and the variable capacity mechanism may be in contact with each other, a frictional force corresponding to the biasing force generated by the biasing member and the friction coefficient is generated. At least one of the first housing contact surface and the first variable capacity mechanism contact surface may be subjected to processing for increasing a friction coefficient. It may increase the frictional force determined as a product of the friction coefficient and the biasing force. The frictional force may suppress occurrence of slight relative displacement between the first housing and the variable capacity mechanism. Occurrence of slight relative displacement between components, therefore, may be suppressed.

The turbocharger may include a second housing configured to rotatably support a rotating shaft to which the turbine blade wheel is fixed and an annular intermediate member disposed between the first housing and the variable capacity mechanism. The variable capacity mechanism may have a first arrangement hole through which the turbine blade wheel or the rotating shaft is inserted and a second variable capacity mechanism contact surface surrounding the first arrangement hole. The intermediate member may have a first intermediate member contact surface in contact with the second variable capacity mechanism contact surface. At least one of the second variable capacity mechanism contact surface and the first intermediate member contact surface may be subjected to the processing for increasing the friction coefficient. With this example, it may suppress occurrence of slight relative displacement between the variable capacity mechanism and the intermediate member.

The turbocharger may include a second housing configured to rotatably support a rotating shaft to which the turbine blade wheel is fixed and an annular intermediate member disposed between the first housing and the variable capacity mechanism. The intermediate member may have a second intermediate member contact surface that faces the second housing and that is in contact with the biasing member. The biasing member may have a first biasing member contact surface in contact with the second intermediate member contact surface. At least one of the second intermediate member contact surface and the first biasing member contact surface may be subjected to the processing for increasing the friction coefficient. With this example, it may suppress occurrence of slight relative displacement between the biasing member and the intermediate member.

The turbocharger may include a second housing configured to rotatably support a rotating shaft to which the turbine blade wheel is fixed. The second housing may have a second housing contact surface in contact with the biasing member in the axial direction of the rotation axis. The biasing member may have a second biasing member contact surface in contact with the second housing contact surface. At least one of the second housing contact surface and the second biasing member contact surface may be subjected to the processing for increasing the friction coefficient. With this example, it may suppress occurrence of slight relative displacement between the biasing member and the second housing.

The turbocharger may include a second housing configured to rotatably support a rotating shaft to which the turbine blade wheel is fixed. The variable capacity mechanism may have a first arrangement hole through which the turbine blade wheel or the rotating shaft is inserted. The first arrangement hole may include a first arrangement hole inner peripheral surface portion in which a second housing shoulder portion of the second housing is disposed. The second housing shoulder portion may have a second housing shoulder surface in contact with the first arrangement hole inner peripheral surface portion. At least one of the first arrangement hole inner peripheral surface portion and the second housing shoulder surface may be subjected to the processing for increasing the friction coefficient. With this example, it may suppress occurrence of slight relative displacement between the variable capacity mechanism and the second housing.

An example turbocharger may include a turbine blade wheel, a first housing including a flow path through which gas received from an inlet flows, a variable capacity mechanism disposed in the first housing and configured to receive the gas from the flow path and guide the gas to the turbine blade wheel, the variable capacity mechanism including a disk-shaped nozzle ring having a main surface facing the turbine blade wheel and a plurality of nozzle vanes that is arranged on a main surface side of the nozzle ring and that forms a plurality of nozzle flow paths for guiding the gas, and a biasing member configured to apply, the variable capacity mechanism, a biasing force pressing the variable capacity mechanism against the first housing. The first housing may have a first housing contact surface in contact with the variable capacity mechanism in an axial direction of a rotation axis of the turbine blade wheel. The variable capacity mechanism may have a first variable capacity mechanism contact surface in contact with the first housing contact surface in the axial direction of the rotation axis. The nozzle ring may have a separated surface separated from a first component, which is different from the nozzle ring, and a sliding surface on which a second component, which is different from the nozzle ring, slides. Surface roughness of at least one of the first housing contact surface and the first variable capacity mechanism contact surface may be greater than a surface roughness of the separated surface.

In a portion where the first housing and the variable capacity mechanism are in contact with each other, a frictional force corresponding to the biasing force generated by the biasing member and the friction coefficient is generated. The surface roughness of at least one of the first housing contact surface and the first variable capacity mechanism contact surface may be greater than the surface roughness of the separated surface. It may increase the frictional force determined as the product of the friction coefficient corresponding to the surface roughness and the biasing force. This frictional force may suppress occurrence of slight relative displacement between the first housing and the variable capacity mechanism. Occurrence of slight relative displacement between components, therefore, may be suppressed.

In some example turbochargers, the surface roughness of at least one of the first housing contact surface and the first variable capacity mechanism contact surface may be greater than a surface roughness of the sliding surface. With this example, it may suppress occurrence of slight relative displacement between components.

In some example turbochargers, the first component may include the first housing. The separated surface may include an outer peripheral surface of the nozzle ring that faces the inner peripheral surface of the first housing and that is separated from the inner peripheral surface of the first housing. With this example, it may suppress occurrence of slight relative displacement between components.

In some example turbochargers, the second component may include the nozzle vanes. The sliding surface may include the main surface of the nozzle ring on which the plurality of nozzle vanes slides. With this example, it may suppress occurrence of slight relative displacement between components.

An example turbocharger 1 illustrated in FIG. 1 is a variable capacity turbocharger. The turbocharger 1 is applied to, for example, an internal combustion engine of a ship or a vehicle. The turbocharger 1 includes a turbine 10 and a compressor 20. The turbine 10 includes a housing (e.g., turbine housing 11), a turbine blade wheel 12, and a variable capacity assembly (e.g., variable capacity mechanism 30). The turbine housing 11 (e.g., first housing) has a flow path (e.g., scroll flow path 13). The scroll flow path 13 extends around the turbine blade wheel 12 in a circumferential direction. The compressor 20 includes a compressor housing 21 and a compressor impeller 22. The compressor impeller 22 is housed in the compressor housing 21. The compressor housing 21 includes a scroll flow path 23. The scroll flow path 23 extends around the compressor impeller 22 in a circumferential direction.

The turbine blade wheel 12 is provided at a first end of a rotating shaft 2. The compressor impeller 22 is provided at a second end of the rotating shaft 2. A second housing (e.g., bearing housing 3) is provided between the turbine housing 11 and the compressor housing 21. The rotating shaft 2 is rotatably supported by the bearing housing 3 via a bearing 4. The rotating shaft 2, the turbine blade wheel 12, and the compressor impeller 22 constitute an integrated rotating body 5. The rotating body 5 rotates about a rotation axis AX.

The turbine housing 11 has an inlet **14*s* and an outlet 14*r*. Exhaust gas discharged from the internal combustion engine flows into the turbine housing 11 through the inlet 14*s*. The exhaust gas that has flowed in flows into the turbine blade wheel 12 through the scroll flow path 13. The exhaust gas rotates the turbine blade wheel 12. Thereafter, the exhaust gas flows out of the turbine housing 11 through the outlet 14*r***.

The compressor housing 21 includes a suction port 24 and a discharge port. When the turbine blade wheel 12 rotates, the compressor impeller 22 rotates via the rotating shaft 2.

The rotating compressor impeller 22 sucks external air through the suction port 24. The sucked air is compressed by passing through the compressor impeller 22 and the scroll flow path 23. The air is discharged from the discharge port as compressed air. The compressed air is supplied to the internal combustion engine.

The turbine 10 has a connection flow path S. The connection flow path S guides exhaust gas from the scroll flow path 13 to the turbine blade wheel 12. A plurality of nozzle vanes 34 is provided in the connection flow path S. The plurality of nozzle vanes 34 is arranged at equal intervals on a reference circle centered on the rotation axis AX. Nozzle vanes 34 adjacent to each other constitute a nozzle. The nozzle vanes 34 rotate synchronously about an axis parallel to the rotation axis AX. Cross-sectional area of the connection flow path S is adjusted by rotating the plurality of nozzle vanes 34. The turbine 10 includes a variable capacity mechanism 30 as a mechanism for adjusting the cross-sectional area of the connection flow path S. The variable capacity mechanism 30 is attached to the turbine housing 11.

<Variable Capacity Mechanism>

Figure 2:
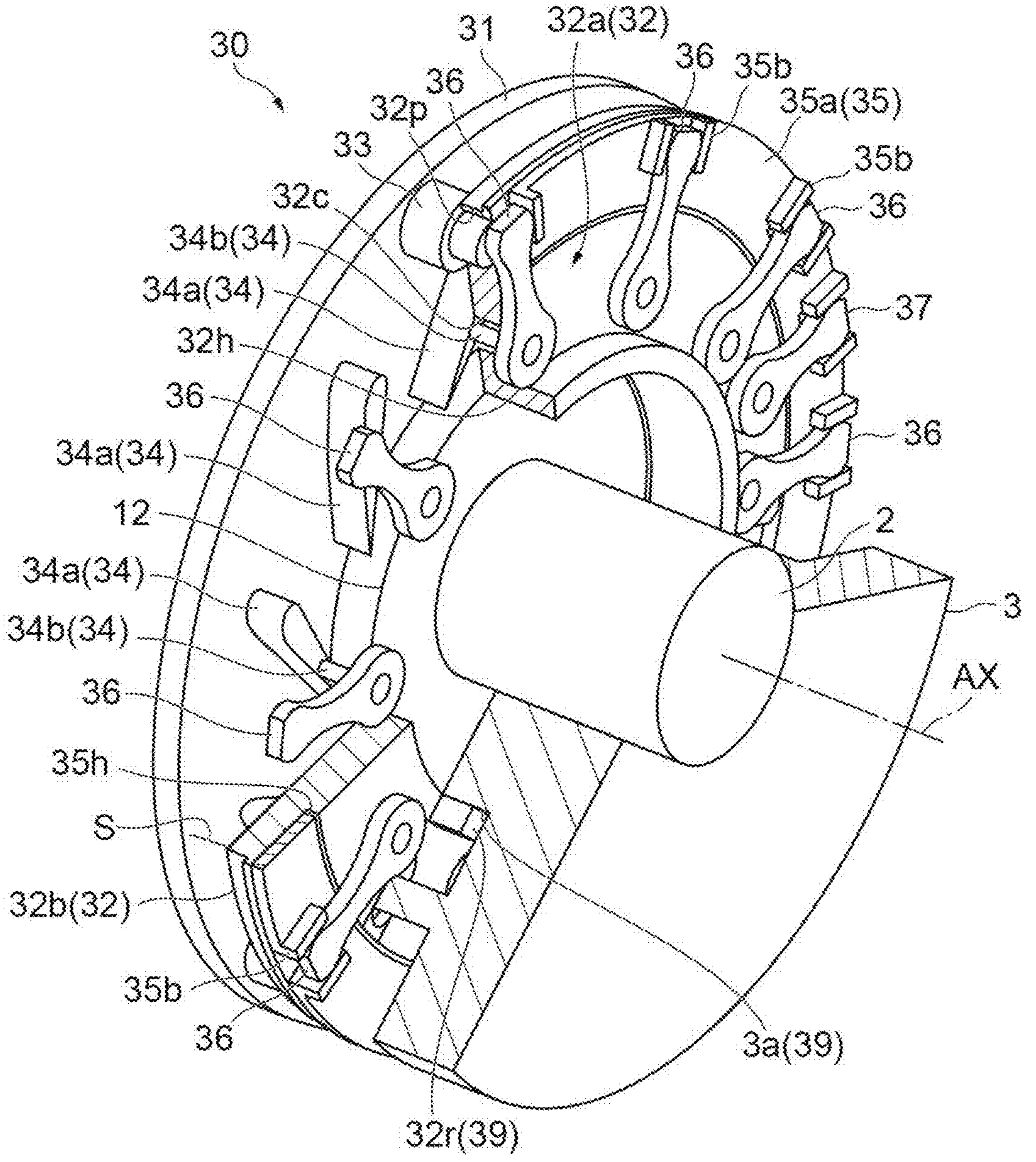
FIG. 2 is a perspective view illustrating a variable capacity mechanism illustrated in FIG. 1.

As illustrated in FIGS. 1 and 2, variable capacity mechanism 30 includes a CC plate (clearance control plate) 31, a nozzle ring 32, and a plurality of CC pins (clearance control pins) 33. The nozzle ring 32 faces the CC plate 31. The CC pins 33 couple the CC plate 31 to the nozzle ring 32. The connection flow path S is formed between the CC plate 31 and the nozzle ring 32. The variable capacity mechanism 30 includes the plurality of nozzle vanes 34, a drive ring 35, a plurality of nozzle link plates 36, and a drive link plate 37. The nozzle link plates 36 and the drive link plate 37 are arranged on a side opposite to the CC plate 31 with respect to the nozzle ring 32. The drive ring 35 and the drive link plate 37 together rotate the nozzle link plates 36. When the nozzle link plates 36 rotate, the nozzle vanes 34 rotate.

The CC plate 31 has a ring shape centered on the rotation axis AX. The CC plate 31 has a shaft hole. The CC plate 31 surrounds, in the circumferential direction, the turbine blade wheel 12 disposed in a shaft hole 31*h*. The circumferential direction of the turbine blade wheel 12 is a direction centered on the rotation axis AX. The CC plate 31 is disposed between scroll flow path 13 and the outlet 14*r*. The CC plate 31 is separated from the nozzle ring 32 along the rotation axis AX. The connection flow path S is formed between the CC plate 31 and the nozzle ring 32. The connection flow path S connects the scroll flow path 13 to the outlet 14*r*. The CC plate 31 is disposed on a side opposite to the bearing housing 3 with respect to the nozzle ring 32. The CC plate 31 has a plurality of pin holes 31*p*. Intervals of the plurality of pin holes 31*p* in the circumferential direction are equal to one another.

The nozzle ring 32 also has a ring shape centered on the rotation axis AX. The nozzle ring 32 has a nozzle ring shaft hole 32*h*. The nozzle ring 32, too, surrounds, in the circumferential direction, the turbine blade wheel 12 disposed in the nozzle ring shaft hole 32*h*. The nozzle ring 32, too, is disposed between the scroll flow path 13 and the outlet 14*r*. The CC plate 31 is parallel to the nozzle ring 32. The nozzle ring 32 has a plurality of pin holes 32*p*. Intervals of the plurality of pin holes 32*p* in the circumferential direction are equal to one another. Center axes of the pin holes 32*p* align with center axes of the pin holes 31*p*. For example, the pin holes 32*p* are coaxial with the pin holes 31*p*.

The nozzle ring 32 includes a nozzle ring body 32*a* and a drive ring support portion 32*b*. The nozzle ring body 32*a* has a cylindrical shape. The nozzle ring body 32*a* has the nozzle ring shaft hole 32*h*. The nozzle ring body 32*a* has a plurality of vane shaft holes 32*c*. Intervals of the plurality of vane shaft holes 32*c* in the circumferential direction are equal to one another. The drive ring support portion 32*b* protrudes from an outer peripheral surface of the nozzle ring body 32*a* in a radial direction Db. Outer diameter of the nozzle ring 32 is defined by outer diameter of the drive ring support portion 32*b*. The drive ring support portion 32*b* has a plurality of pin holes 32*p*. Positions of the pin holes 32*p* are outside those of the vane shaft holes 32*c* in the radial direction Db of the nozzle ring 32.

The nozzle ring 32 is separated from the CC plate 31. A gap is formed between the nozzle ring 32 and the CC plate 31. The gap is the connection flow path S through which exhaust gas flows. The gap between the nozzle ring 32 and the CC plate 31 is maintained by the CC pins 33. First ends of the CC pins 33 are inserted into the pin holes 31*p* in the CC plate 31. Second ends of the CC pins 33 are inserted into the pin holes 32*p* in the nozzle ring 32.

The plurality of nozzle vanes 34 is arranged on the reference circle centered on the rotation axis AX. The nozzle vanes 34 include vane bodies 34*a* and vane shafts 34*b*. The vane bodies 34*a* are arranged between the CC plate 31 and the nozzle ring 32. The vane bodies 34*a* are arranged in the connection flow path S. First ends of the vane shafts 34*b* are fixed to the vane bodies 34*a*. Second ends of the vane shafts 34*b* are inserted into the vane shaft holes 32*c* in the nozzle ring 32. Tips of the second ends of the vane shafts 34*b* protrude from the nozzle ring bodies 32*a*. The vane shafts 34*b* are rotatable with respect to the nozzle ring 32. The vane bodies 34*a* rotate as the vane shafts 34*b* rotate. In the variable capacity mechanism 30, the cross-sectional area of the connection flow path S is adjusted by rotating the vane bodies 34*a*. As a result of the adjustment of the cross-sectional area, the flow velocity of the exhaust gas supplied from the scroll flow path 13 to the turbine blade wheel 12 is controlled. Rotation speed of the turbine blade wheel 12, therefore, can be adjusted to a desired value.

The drive ring 35 is disposed on the drive ring support portion 32*b*. The drive ring 35 has a ring shape centered on the rotation axis AX. The drive ring 35 has a shaft hole 35*h*. The nozzle ring body 32*a* is inserted into the shaft hole 35*h*. The drive ring 35 is coaxial with the nozzle ring 32. The drive ring 35 is rotatable with respect to the nozzle ring 32 about the rotation axis AX. The drive ring 35 includes a drive ring body 35*a* and a plurality of link plate disposed portions 35*b*. Intervals of the link plate disposed portions 35*b* in the circumferential direction are equal to one another. The link plate disposed portions 35*b* each include two upright members separated from each other in the circumferential direction.

The nozzle link plates 36 have a bar shape. First ends of the nozzle link plates 36 are fixed to ends of the vane shafts 34*b*. Second ends of the nozzle link plates 36 are arranged in the link plate disposed portions 35*b* of the drive ring 35. The second ends of the nozzle link plates 36 are each arranged between the two upright members of the corresponding the link plate disposed portion 35*b*. When the drive ring 35 receives driving force from the drive link plate 37, the drive ring 35 rotates about the rotation axis AX. As a result of this rotation, the second ends of the nozzle link plates 36 move in the circumferential direction as the drive ring 35 rotates. As a result, the nozzle link plates 36 rotate about the vane shafts 34*b*. When the nozzle link plates 36 rotate, the vane shafts 34*b* attached to the first ends of the nozzle link plates 36 rotate. As the vane shafts 34*b* rotate, the vane bodies 34*a* attached to the first ends of the vane shafts 34*b* rotate. As a result, distances between the vane bodies 34*a* change. That is, the cross-sectional area of the connection flow path S changes.

An intermediate plate (e.g., a heat shielding plate 61) is provided between the variable capacity mechanism 30 and the bearing housing 3. The heat shielding plate 61 is disposed inside the nozzle ring shaft hole 32*h* of the nozzle ring 32. The heat shielding plate 61 (e.g., intermediate member) has a ring shape centered on the rotation axis AX. The heat shielding plate 61 prevents the turbine housing 11 from transferring heat to the bearing housing 3. As a result, increases in temperature of components arranged on a bearing housing 3 side are suppressed. A disc spring 62 (biasing member) is compressed and deformed in an axial direction Da by being sandwiched between the heat shielding plate 61 and the bearing housing 3. The disc spring 62 exerts an elastic force against compressive deformation. The disc spring 62 presses the heat shielding plate 61 against the nozzle ring 32.

Figure 3:
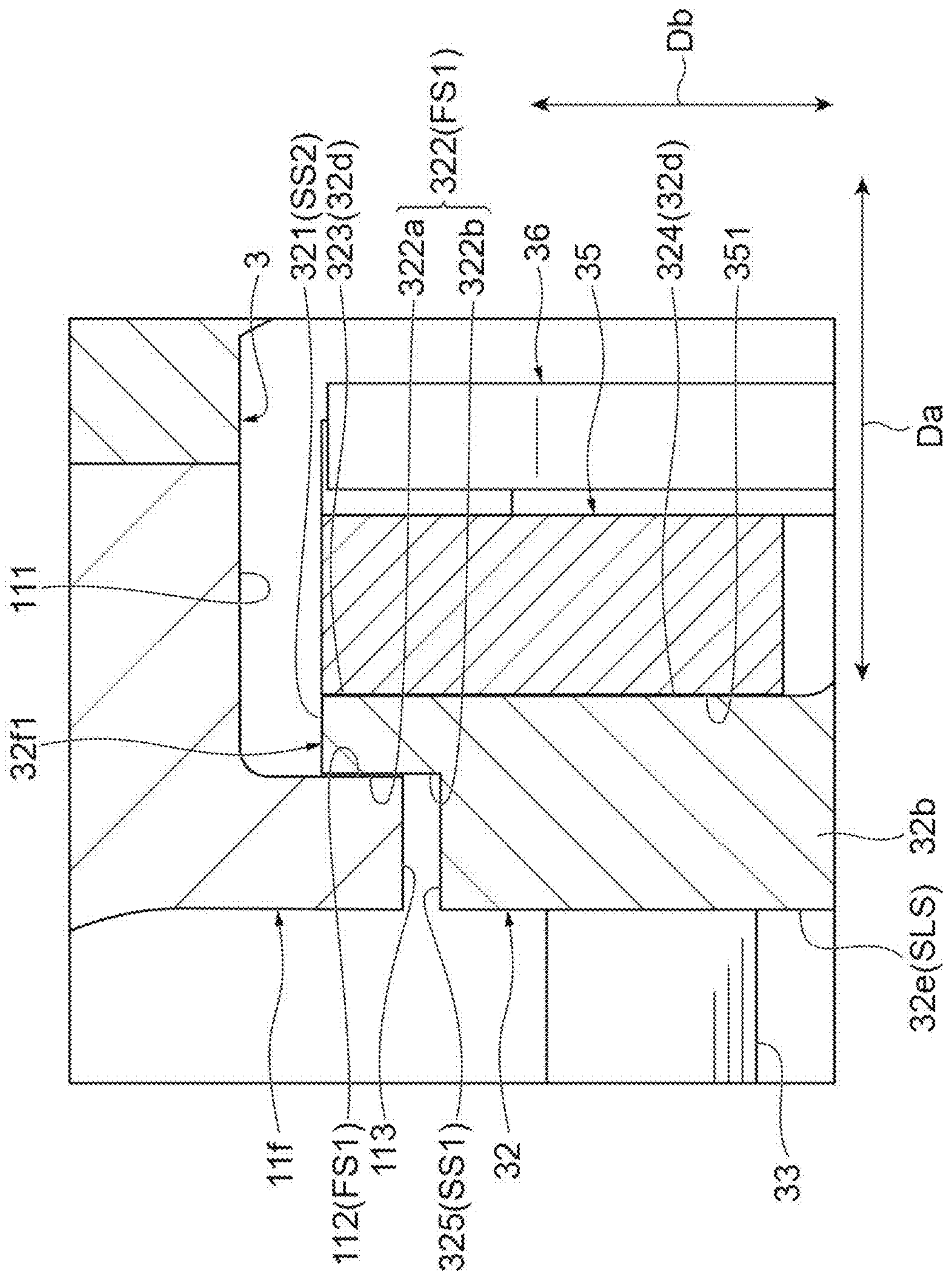
FIG. 3 is an enlarged view illustrating a portion where a turbine housing and the variable capacity mechanism illustrated in FIG. 1 are in contact with each other.

FIG. 3 is an enlarged view of a region S1 in FIG. 1. FIG. 3 illustrates an enlarged portion of the variable capacity mechanism 30 in contact with the turbine housing 11. The nozzle ring 32 of the variable capacity mechanism 30 further includes a nozzle ring outer flange **32*f*1 in addition to the nozzle ring body 32***a* and the drive ring support portion 32*b*.

The nozzle ring outer flange **32*f*1 protrudes from a drive ring support portion outer peripheral surface 325 of the drive ring support portion 32***b* in the radial direction Db. The nozzle ring outer flange **32*f*1 includes a nozzle ring outer flange outer peripheral surface 321, an assembly contact surface (e.g., nozzle ring outer flange main surface 322), and a nozzle ring outer flange back surface 323**.

The nozzle ring outer flange outer peripheral surface 321 faces an inner peripheral surface (e.g., turbine housing inner peripheral surface 111). The nozzle ring outer flange outer peripheral surface 321 is not in contact with the turbine housing inner peripheral surface 111. There is a gap between the nozzle ring outer flange outer peripheral surface 321 and the turbine housing inner peripheral surface 111.

The nozzle ring outer flange main surface 322 (e.g., first variable capacity mechanism contact surface) faces a housing contact surface (e.g., turbine housing flange back surface 112). The nozzle ring outer flange main surface 322 is in contact with the turbine housing flange back surface 112 (e.g., first housing contact surface) of a turbine housing flange 11*f*. This contact determines a position of the variable capacity mechanism 30 along the rotation axis AX. More particularly, the nozzle ring outer flange main surface 322 is pressed against the turbine housing flange back surface 112.

For example, the nozzle ring outer flange main surface 322 includes a region that is in contact with the turbine housing flange back surface 112 and a region that is not in contact with the turbine housing flange back surface 112. The region in contact with the turbine housing flange back surface 112 will be referred to as a flange main surface contact region 322*a*. The region not in contact with the turbine housing flange back surface 112 will be referred to as a flange main surface non-contact region 322*b*.

The nozzle ring outer flange back surface 323 is flush with a drive ring support portion back surface 324. The nozzle ring outer flange back surface 323 and the drive ring support portion back surface 324 together constitute a drive ring support surface 32*d*. The drive ring support surface 32*d* faces a drive ring main surface 351. The drive ring support surface 32*d* is in contact with the drive ring main surface 351. The drive ring support surface 32*d* slides about the rotation axis AX with respect to the drive ring main surface 351.

The drive ring support portion outer peripheral surface 325 is a cylindrical surface located between the nozzle ring outer flange main surface 322 and the nozzle ring main surface 32*e*. The drive ring support portion outer peripheral surface 325 faces the turbine housing flange inner peripheral surface 113. The drive ring support portion outer peripheral surface 325 is not in contact with the turbine housing flange inner peripheral surface 113. There is a gap between the drive ring support portion outer peripheral surface 325 and the turbine housing flange inner peripheral surface 113. This gap corresponds to the flange main surface non-contact region 322*b* described above.

It has already been mentioned that the nozzle ring outer flange main surface 322 is pressed against the turbine housing flange back surface 112. A force pressing the nozzle ring outer flange main surface 322 against the turbine housing flange back surface 112 is generated by the disc spring 62 (see FIG. 1). Frictional force is generated between the nozzle ring outer flange main surface 322 and the turbine housing flange back surface 112 by the force generated by the disc spring 62. This frictional force prevents the variable capacity mechanism 30 from being slightly displaced relative to the turbine housing 11.

The frictional force is determined as a product of a friction coefficient and pressing force. The nozzle ring outer flange main surface 322 is subjected to surface processing for increasing the friction coefficient. Examples of the surface processing for increasing the friction coefficient include knurling and blasting. The nozzle ring outer flange main surface 322 may include a high friction surface FS1 processed to increase a friction coefficient. The high friction surface FS1 may include a knurled surface or a blasted surface. The surface roughness of the high friction surface FS1 formed on the nozzle ring outer flange main surface 322 may be greater than a surface roughness of the turbine housing flange back surface 112 where the high friction surface FS1 is not formed.

In the case of processing for providing minute irregularities on a surface as in knurling, the irregularities may be formed in such a way as to prevent the nozzle ring 32 from rotating about the rotation axis AX. When minute grooves are formed, for example, the grooves radially extending on the nozzle ring outer flange main surface 322 in the radial direction Db may be provided. The nozzle ring outer flange main surface 322 may be provided with twill pattern irregularities by knurling.

The surface processing may be performed at least in the flange main surface contact region 322*a* of the nozzle ring outer flange main surface 322. The flange main surface non-contact region 322*b* may or may not be subjected to the surface processing for increasing the friction coefficient. The flange main surface contact region 322*a* include a region subjected to the surface processing for increasing the friction coefficient. An entire surface of the flange main surface contact region 322*a* may be subjected to the surface processing for increasing the friction coefficient. A part of the flange main surface contact region 322*a* may be subjected to the surface processing for increasing the friction coefficient.

A high friction coefficient of the nozzle ring outer flange main surface 322 means that the surface roughness of the nozzle ring outer flange main surface 322 is large. For example, the drive ring support surface 32*d* slides with respect to the drive ring main surface 351. The drive ring main surface 351 is an example of a sliding surface. The surface roughness of a sliding surface is generally low. The surface roughness of the nozzle ring outer flange main surface 322, therefore, is greater than that of the drive ring support surface 32*d*. Similarly, the surface roughness of the nozzle ring outer flange main surface 322 is greater than that of the nozzle ring main surface 32*e*, which is a sliding surface SLS with respect to the nozzle vanes 34.

There are also separated (e.g., non-contacted) surfaces SS1, SS2 that are not in contact with any member. The separated surfaces SS1 may include drive ring support portion outer peripheral surface 325. The separated surfaces SS2 may include nozzle ring outer flange outer peripheral surface 321. Each of separated surfaces SS1, SS2 face an inner peripheral surface 111 of the housing 11. Each of separated surfaces SS1, SS2 is separated from the inner peripheral surface 111. Each of separated surfaces SS1, SS2 does not contact the inner peripheral surface. The surface roughness of a separated surface not in contact with any member is greater than that of a sliding surface such as the drive ring support surface 32*d*. The surface roughness of the nozzle ring outer flange main surface 322 is equal to or greater than that of the drive ring support portion outer peripheral surface 325. The surface roughness of the nozzle ring outer flange main surface 322 is equal to or greater than that of the nozzle ring outer flange outer peripheral surface 321.

A relationship of the surface roughness may also be treated in the same manner as the surface processing for increasing the friction coefficient. A region having a surface roughness with an increased friction coefficient may be formed in at least the flange main surface contact region 322*a* of the nozzle ring outer flange main surface 322. The surface roughness of the flange main surface non-contact region 322*b* may be a surface roughness with an increased friction coefficient, or may be another surface roughness. The surface roughness of the flange main surface non-contact region 322*b* may be a surface roughness where a friction coefficient of the entire surface of the flange main surface contact region 322*a* is increased. The surface roughness of the flange main surface non-contact region 322*b* may be a surface roughness where a friction coefficient of a part of the flange main surface contact region 322*a* is increased.

By increasing the friction coefficient of the nozzle ring outer flange main surface 322, it may suppress slight displacement of the nozzle ring outer flange main surface 322 with respect to the turbine housing flange back surface 112. The surface processing for increasing the friction coefficient and processing for defining surface roughness may be performed on the turbine housing flange back surface 112 in contact with the nozzle ring outer flange main surface 322. The turbine housing flange back surface 112 may include a high friction surface FS1 processed to increase a friction coefficient. The high friction surface FS1 may include a knurled surface or a blasted surface. The surface roughness of the high friction surface FS1 formed on the turbine housing flange back surface 112 may be greater than surface roughness of the nozzle ring outer flange main surface 322 where the high friction surface FS1 is not formed.

In some examples, the surface processing for increasing the friction coefficient and the processing for defining surface roughness may be performed only on the nozzle ring outer flange main surface 322 and not on the turbine housing flange back surface 112. In other examples, the surface processing for increasing the friction coefficient and the processing for defining surface roughness may be performed only on the turbine housing flange back surface 112 and not on the nozzle ring outer flange main surface 322. The surface processing for increasing the friction coefficient and the processing for defining surface roughness may be performed on both the nozzle ring outer flange main surface 322 and the turbine housing flange back surface 112.

By increasing frictional force between the nozzle ring outer flange main surface 322 and the turbine housing flange back surface 112, slight displacement of the variable capacity mechanism 30 with respect to the turbine housing 11 can be suppressed. Even if the turbocharger 1 is in the operating state, slight displacement of the variable capacity mechanism 30 with respect to the turbine housing 11 may be suppressed.

When the turbocharger 1 is in the operating state, a high-temperature gas flows through the variable capacity mechanism 30. As a result, the components of the variable capacity mechanism 30 are thermally deformed. The thermal deformation results in a slight deviation in a positional relationship between the components. For example, a distance from the heat shielding plate 61 to the bearing housing 3 may increase. When the distance from the heat shielding plate 61 to the bearing housing 3 increases, a disc spring load generated by the disc spring 62 decreases. Since the disc spring load is a force pressing the variable capacity mechanism 30 against the turbine housing 11, a decrease in the disc spring load generated by the disc spring 62 causes a decrease in the force pressing the variable capacity mechanism 30 against the turbine housing 11. The force pressing the variable capacity mechanism 30 against the turbine housing 11 provides a frictional force for suppressing slight displacement of the variable capacity mechanism 30 with respect to the turbine housing 11 as described above. A decrease in the force pressing the variable capacity mechanism 30 against the turbine housing 11, therefore, results in a decrease in the frictional force. As a result, since the force for restraining the variable capacity mechanism 30 with respect to the turbine housing 11 decreases, the variable capacity mechanism 30 is likely to be slightly displaced with respect to the turbine housing 11 due to external force.

As another factor, Young's modulus of the disc spring 62 decreases due to an increase in temperature of the disc spring 62. A decrease in Young's modulus results in a decrease in the spring load. Since the frictional force is also reduced due to this factor, therefore, the variable capacity mechanism 30 tends to be slightly displaced with respect to the turbine housing 11.

When the turbocharger 1 is in the operating state, the force pressing the variable capacity mechanism 30 against the turbine housing 11 tends to decrease. The frictional force is a product of pressing force and the friction coefficient. When the friction coefficient is sufficiently large, therefore, even if a force that induces slight relative displacement between the variable capacity mechanism 30 and the turbine housing 11 is caused due to external force in a state where the pressing force is reduced, a frictional force that can oppose this force can be secured.

For the purpose of suppressing slight displacement of the variable capacity mechanism 30 with respect to the turbine housing 11, the effect can be further enhanced by applying the processing for increasing the friction coefficient to another portion.

Figure 4:
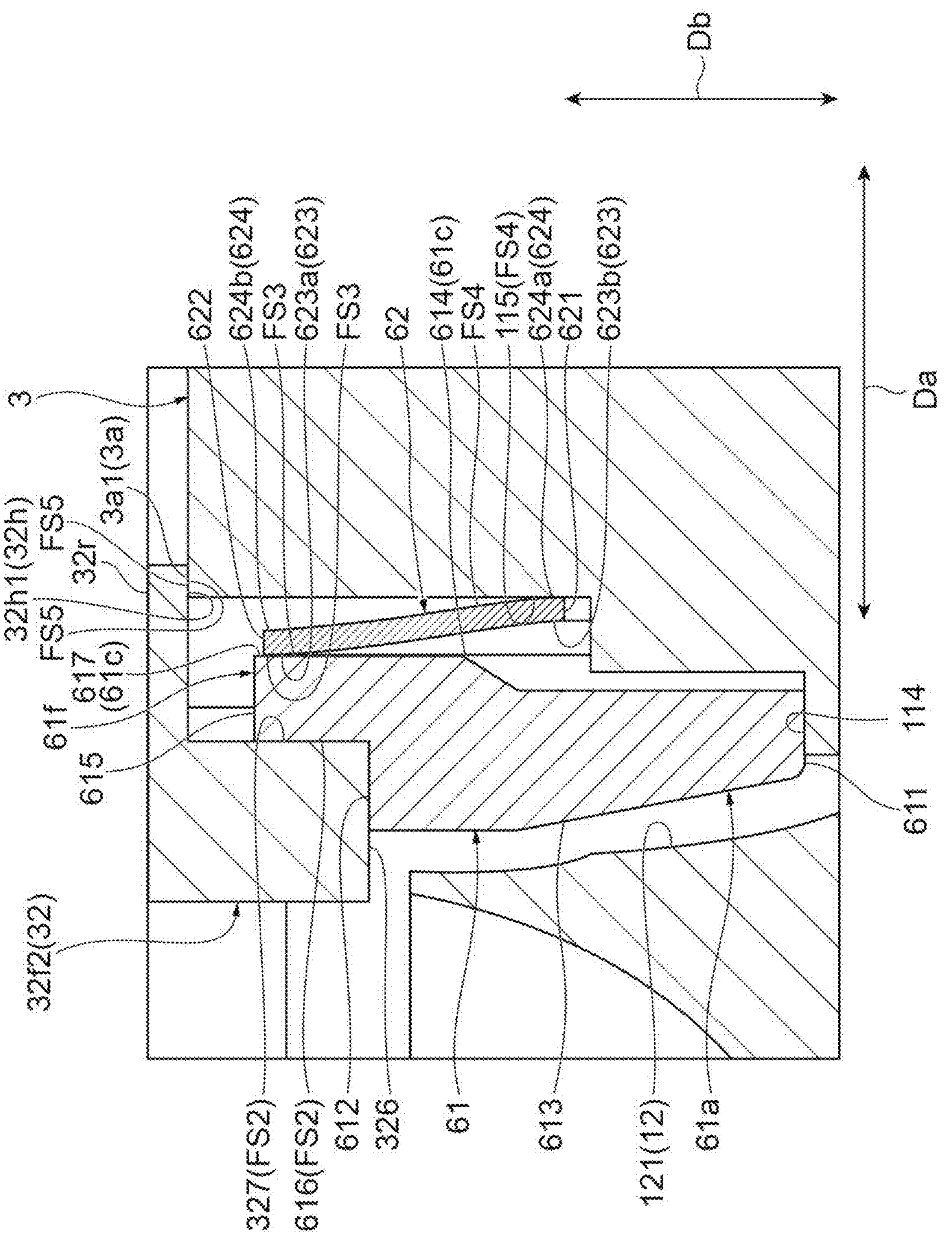
FIG. 4 is an enlarged view illustrating main portions of a heat shielding plate, the variable capacity mechanism, and a bearing housing illustrated in FIG. 1.

FIG. 4 is an enlarged view of a region S2 in FIG. 1. FIG. 4 illustrates the heat shielding plate 61 and the disc spring 62 in an enlarged manner. In FIG. 4, an example in which the processing for increasing the friction coefficient is performed at three portions will be described. First, a portion where the heat shielding plate 61 and the nozzle ring 32 are in contact with each other may be subjected to the processing for increasing the friction coefficient. Second, a portion where the heat shielding plate 61 and the disc spring 62 are in contact with each other may be subjected to the processing for increasing the friction coefficient. Third, a portion where the disc spring 62 and the bearing housing 3 are in contact with each other may be subjected to the processing for increasing the friction coefficient.

The heat shielding plate 61 will be described. The heat shielding plate 61 includes a heat shielding plate body 61*a* and a heat shielding plate flange 61*f*. The heat shielding plate body 61*a* has a ring shape, and has a heat shielding plate body inner peripheral surface 611 and a heat shielding plate body outer peripheral surface 612. The heat shielding plate body inner peripheral surface 611 faces a bearing housing receiving surface 114. The heat shielding plate body inner peripheral surface 611 is in contact with the bearing housing receiving surface 114. The heat shielding plate body outer peripheral surface 612 faces an edge of the nozzle ring 32. The edge of the nozzle ring 32 is a nozzle ring inner flange 32*f*2 protruding from an inner peripheral surface surrounding the nozzle ring shaft hole 32*h*. For example, the heat shielding plate body outer peripheral surface 612 is in contact with a nozzle ring inner flange inner peripheral surface 326.

The heat shielding plate body 61*a* has a heat shielding plate body main surface 613. The heat shielding plate body main surface 613 faces a turbine blade wheel back surface 121 of the turbine blade wheel 12. The heat shielding plate body main surface 613 is not in contact with the turbine blade wheel back surface 121. There is a gap between the heat shielding plate body main surface 613 and the turbine blade wheel back surface 121.

The heat shielding plate body 61*a* has a heat shielding plate body back surface 614. The heat shielding plate body back surface 614 faces the bearing housing 3. The heat shielding plate body back surface 614 faces a second housing contact surface (e.g., bearing housing bottom surface 115). The heat shielding plate body back surface 614 is not in contact with the bearing housing bottom surface 115. There is a gap between the heat shielding plate body back surface 614 and the bearing housing bottom surface 115. The disc spring 62 is disposed in this gap. As illustrated in FIG. 1, the bearing housing 3 abuts against the turbine housing 11 at an abutment portion 3*p*. This abutment determines a distance from the heat shielding plate body back surface 614 to the bearing housing bottom surface 115.

The heat shielding plate flange 61*f* has a heat shielding plate flange outer peripheral surface 615. The heat shielding plate flange outer peripheral surface 615 faces an inner peripheral surface portion (e.g., nozzle ring shaft hole inner peripheral surface 32*h*1). The heat shielding plate flange outer peripheral surface 615 is not in contact with the nozzle ring shaft hole inner peripheral surface 32*h*1. There is a gap between the heat shielding plate flange outer peripheral surface 615 and the nozzle ring shaft hole inner peripheral surface 32*h*1.

The heat shielding plate flange 61*f* has an intermediate member contact surface (e.g., heat shielding plate flange main surface 616). The heat shielding plate flange main surface 616 (e.g., first intermediate member contact surface) faces a nozzle ring inner flange back surface 327 (second variable capacity contact surface) of the nozzle ring inner flange 32*f*2. An entire surface of the heat shielding plate flange main surface 616 is in contact with a part of the nozzle ring inner flange back surface 327. The heat shielding plate flange main surface 616 is pressed against the nozzle ring inner flange back surface 327. A portion where the heat shielding plate flange main surface 616 is pressed against the nozzle ring inner flange back surface 327 is the first portion described above.

At least one of the heat shielding plate flange main surface 616 and the nozzle ring inner flange back surface 327, therefore, may be subjected to the surface processing for increasing the friction coefficient or processing for achieving a surface roughness with an increased friction coefficient. The heat shielding plate flange main surface 616 may include a high friction surface FS2 processed to increase a friction coefficient. The nozzle ring inner flange back surface 327 may include a high friction surface FS2 processed to increase a friction coefficient. The high friction surface FS2 may include a knurled surface or a blasted surface. The surface roughness of the high friction surface FS2 formed on the heat shielding plate flange main surface 616 may be greater than a surface roughness of the nozzle ring inner flange back surface 327 where the high friction surface FS2 is not formed. The surface roughness of the high friction surface FS2 formed on the nozzle ring inner flange back surface 327 heat shielding plate flange main surface 616 may be greater than a surface roughness of the heat shielding plate flange main surface 616 where the high friction surface FS2 is not formed.

The heat shielding plate flange 61*f* has a second intermediate member contact surface (e.g., heat shielding plate flange back surface 617). An intermediate member contact surface (e.g., heat shielding plate back surface 61*c*) includes the heat shielding plate flange back surface 617 and the heat shielding plate body back surface 614. The heat shielding plate back surface 61*c* faces the bearing housing bottom surface 115. The heat shielding plate back surface 61*c* (e.g., second intermediate member contact surface) is not in contact with the bearing housing bottom surface 115. There is a gap between the heat shielding plate back surface 61*c* and the bearing housing bottom surface 115. This gap is managed by the bearing housing 3 abutting against the turbine housing 11 as described above. The disc spring 62 is disposed in this gap.

The disc spring 62 will be described. The disc spring 62 is a ring-shaped member. The disc spring 62 has a disc spring inner peripheral surface 621 and a disc spring outer peripheral surface 622. The disc spring inner peripheral surface 621 is shifted in an axial direction Da of the rotation axis AX with respect to the disc spring outer peripheral surface 622. An elastic force is generated by crushing the disc spring 62 in the axial direction Da of the rotation axis AX so as to eliminate this shift.

The disc spring 62 has a biasing member contact surface (e.g., disc spring main surface 623). The disc spring main surface 623 (first biasing member contact surface) faces the heat shielding plate back surface 61*c*. The disc spring main surface 623 is in contact with the heat shielding plate back surface 61*c*. The disc spring main surface 623 is pressed against the heat shielding plate back surface 61*c* (second intermediate member contact surface). The disc spring main surface 623 is pressed against the heat shielding plate flange back surface 617. The disc spring main surface outer peripheral portion 623*a* of the disc spring main surface 623 is pressed against the heat shielding plate flange back surface 617. A part of disc spring main surface 623 is in contact with the heat shielding plate flange back surface 617. The disc spring main surface inner peripheral portion 623*b* is not in contact with the heat shielding plate flange back surface 617. A region of the disc spring main surface 623 in contact with the heat shielding plate flange back surface 617 changes depending on a degree to which the disc spring 62 is crushed. A portion where the disc spring main surface 623 is pressed against the heat shielding plate flange back surface 617 is the second portion described above.

At least one of the disc spring main surface 623 and the heat shielding plate flange back surface 617 may be subjected to the surface processing for increasing the friction coefficient or the processing for achieving a surface roughness with an increased friction coefficient. The heat shielding plate flange back surface 617 may include a high friction surface FS3 processed to increase the friction coefficient. The disc spring main surface 623 may include a high friction surface FS3 processed to increase the friction coefficient. The high friction surface FS3 may include a knurled surface or a blasted surface. The surface roughness of the high friction surface FS3 formed on the heat shielding plate flange back surface 617 may be greater than a surface roughness of the disc spring main surface 623 where the high friction surface FS3 is not formed. The surface roughness of the high friction surface FS3 formed on the disc spring main surface 623 may be greater than a surface roughness of the heat shielding plate flange back surface 617 where the high friction surface FS3 is not formed.

The disc spring 62 has a biasing member contact surface (e.g., disc spring back surface 624). The disc spring back surface 624 (second biasing member contact surface) faces the bearing housing bottom surface 115 (second housing contact surface). The disc spring back surface 624 faces the bearing housing bottom surface 115. The disc spring back surface 624 is pressed against the bearing housing bottom surface 115. A disc spring back surface inner peripheral portion 624*a* of the disc spring back surface 624 is pressed against the bearing housing bottom surface 115. A part of the disc spring back surface 624 is in contact with the bearing housing bottom surface 115. The disc spring back surface outer peripheral portion 624*b* is not in contact with the bearing housing bottom surface 115. A region of the disc spring main surface 623 in contact with the bearing housing bottom surface 115 changes depending on a degree to which the disc spring 62 is crushed. The portion of the disc spring back surface 624 pressed against the bearing housing bottom surface 115 is the third portion described above.

At least one of the disc spring back surface 624 and the bearing housing bottom surface 115, therefore, may be subjected to the surface processing for increasing the friction coefficient. In addition, at least one of the disc spring back surface 624 and the bearing housing bottom surface 115 may be subjected to the processing for achieving a surface roughness with an increased friction coefficient.

The turbocharger 1 illustrated in FIG. 1, includes a turbine blade wheel 12, a turbine housing 11 including a flow path through which gas received from an inlet 14*s* flows, a variable capacity mechanism 30 disposed in the turbine housing 11 and configured to receive the gas from the flow path and guide the gas to the turbine blade wheel 12, and a disc spring 62 configured to apply, to the variable capacity mechanism 30, a biasing force pressing the variable capacity mechanism 30 against the turbine housing 11. The turbine housing 11 has a turbine housing flange back surface 112 in contact with the variable capacity mechanism 30 in an axial direction Da of a rotation axis AX of the turbine blade wheel 12. The variable capacity mechanism 30 has a nozzle ring outer flange main surface 322 in contact with the turbine housing flange back surface 112 in the axial direction Da of the rotation axis AX. At least one of the turbine housing flange back surface 112 and the nozzle ring outer flange main surface 322 is subjected to processing for increasing a friction coefficient.

In a portion where the turbine housing 11 and the variable capacity mechanism 30 are in contact with each other, a frictional force corresponding to the biasing force generated by the disc spring 62 and the friction coefficient is generated. At least one of the turbine housing flange back surface 112 and the nozzle ring outer flange main surface 322 is subjected to the processing for increasing the friction coefficient. It therefore may increase the frictional force determined as a product of the friction coefficient and the biasing force. The frictional force can suppress occurrence of slight relative displacement between the turbine housing 11 and the variable capacity mechanism 30. Occurrence of slight relative displacement between components, therefore, can be suppressed.

The turbocharger 1 further includes a bearing housing 3 rotatably supporting the rotating shaft 2 to which the turbine blade wheel 12 is fixed and an annular heat shielding plate 61 disposed between the turbine housing 11 and the variable capacity mechanism 30. The variable capacity mechanism 30 includes an arrangement hole (e.g., nozzle ring shaft hole 32*h*) through which the turbine blade wheel 12 or the rotating shaft 2 is inserted and a second assembly contact surface (e.g., nozzle ring inner flange back surface 327) surrounding the nozzle ring shaft hole 32*h*. The heat shielding plate 61 has a heat shielding plate flange main surface 616 in contact with the nozzle ring inner flange back surface 327. At least one of the nozzle ring inner flange back surface 327 and the heat shielding plate flange main surface 616 is subjected to the processing for increasing the friction coefficient. With this example, it may suppress occurrence of slight relative displacement between the variable capacity mechanism 30 and the heat shielding plate 61.

The turbocharger 1 illustrated in FIG. 1, further includes a bearing housing 3 rotatably supporting the rotating shaft 2 to which the turbine blade wheel 12 is fixed and an annular heat shielding plate 61 disposed between the turbine housing 11 and the variable capacity mechanism 30. The heat shielding plate 61 has a heat shielding plate flange back surface 617 that faces the bearing housing 3 and that is in contact with the disc spring 62. The disc spring 62 has a disc spring main surface 623 in contact with the heat shielding plate flange back surface 617. At least one of the heat shielding plate flange back surface 617 and the disc spring main surface 623 is subjected to the processing for increasing the friction coefficient. With this example, slight relative displacement between the disc spring 62 and the heat shielding plate 61 may be suppressed.

The turbocharger 1 further includes a bearing housing 3 rotatably supporting the rotating shaft 2 to which the turbine blade wheel 12 is fixed. The bearing housing 3 has a bearing housing bottom surface 115 in contact with the disc spring 62 in the axial direction Da of the rotation axis AX. The disc spring 62 has a disc spring back surface 624 in contact with the bearing housing bottom surface 115. At least one of the bearing housing bottom surface 115 and the disc spring back surface 624 is subjected to the processing for increasing the friction coefficient. With this example, it may suppress occurrence of slight relative displacement between the disc spring 62 and the bearing housing 3.

The bearing housing bottom surface 115 may include a high friction surface FS4 processed to increase the friction coefficient. The disc spring back surface 624 may include a high friction surface FS4 processed to increase the friction coefficient. The high friction surface FS4 may include a knurled surface or a blasted surface. The surface roughness of the high friction surface FS4 formed on the bearing housing bottom surface 115 may be greater than a surface roughness of the disc spring back surface 624 where the high friction surface FS4 is not formed. The surface roughness of the high friction surface FS4 formed on the disc spring back surface 624 may be greater than a surface roughness of the bearing housing bottom surface 115 where the high friction surface FS4 is not formed.

A turbocharger 1 includes a turbine blade wheel 12, a turbine housing 11 including a flow path through which gas received from an inlet 14*s* flows, a variable capacity mechanism 30 disposed in the turbine housing 11 and configured to receive the gas from the flow path and guide the gas to the turbine blade wheel 12, the variable capacity mechanism 30 including a disk-shaped nozzle ring 32 having a main surface facing the turbine blade wheel 12 and a plurality of nozzle vanes 34 that is arranged on a main surface side of the nozzle ring 32 and that forms a plurality of nozzle flow paths for guiding the gas, and a disc spring 62 that applies, to the variable capacity mechanism 30, a biasing force pressing the variable capacity mechanism 30 against the turbine housing 11. The turbine housing 11 has a turbine housing flange back surface 112 in contact with the variable capacity mechanism 30 in an axial direction Da of a rotation axis AX of the turbine blade wheel 12. The variable capacity mechanism 30 has a nozzle ring outer flange main surface 322 in contact with the turbine housing flange back surface 112 in the axial direction Da of the rotation axis AX. The nozzle ring 32 has a separated surface SS1, SS2 separated from a first component, which is different from the nozzle ring 32, and a sliding surface on which a second component, which is different from the nozzle ring 32, slides. The surface roughness of at least one of the turbine housing flange back surface 112 and the nozzle ring outer flange main surface 322 is greater than a surface roughness of the separated surface SS1, SS2.

In a portion where the turbine housing 11 and the variable capacity mechanism 30 are in contact with each other, a frictional force corresponding to the biasing force generated by the disc spring 62 and the friction coefficient is generated. The surface roughness of at least one of the turbine housing flange back surface 112 and the nozzle ring outer flange main surface 322 is greater than the surface roughness of the separated surface SS1, SS2. It therefore may increase the frictional force determined as the product of the friction coefficient corresponding to the surface roughness and the biasing force. This frictional force can suppress occurrence of slight relative displacement between the turbine housing 11 and the variable capacity mechanism 30. Occurrence of slight relative displacement between components, therefore, can be suppressed.

The surface roughness of at least one of the turbine housing flange back surface 112 and the nozzle ring outer flange main surface 322 is greater than the a surface roughness of the separated surface SS1, SS2. With this example, too, it may suppress occurrence of slight relative displacement between components.

The turbocharger is not limited to the above-described examples, and various modifications can be made without departing from the gist of the present disclosure.

The variable capacity mechanism 30 is positioned with respect to the bearing housing 3. A second housing shoulder portion (e.g., protrusion 3*a*) of the bearing housing 3 is fitted into the nozzle ring shaft hole 32*h* (first arrangement hole). A shoulder outer surface (e.g., protrusion outer peripheral surface 3*a*1) of the protrusion 3*a* is in contact with the nozzle ring shaft hole inner peripheral surface 32*h*1 (e.g., first arrangement hole inner peripheral portion). The variable capacity mechanism 30 and the bearing housing 3, therefore, together achieve a mating fit 39. A rib 32*r* and the protrusion 3*a* of the bearing housing 3 have the mating fit 39. The position of the variable capacity mechanism 30 with respect to the bearing housing 3 is determined by the mating fit 39.

At least one of the protrusion outer peripheral surface 3*a*1 of the protrusion 3*a* of the bearing housing 3 and the nozzle ring shaft hole inner peripheral surface 32*h*1 (e.g., inner peripheral portion) may also be subjected to the surface processing for increasing the friction coefficient or the processing for achieving a surface roughness with an increased friction coefficient. This portion is not related to the slight displacement of the variable capacity mechanism 30 caused by a decrease in the pressing force of the disc spring 62 described in the present disclosure. By increasing a friction coefficient between the protrusion outer peripheral surface 3*a*1 of the protrusion 3*a* and the nozzle ring shaft hole inner peripheral surface 32*h*1, on the other hand, it may suppress the variable capacity mechanism 30 from being slightly displaced about the rotation axis AX with respect to the turbine housing 11. With this example, too, it may suppress slight displacement of the variable capacity mechanism 30 with respect to the turbine housing 11.

The turbocharger 1 illustrated in FIG. 1, includes the bearing housing 3 rotatably supporting the rotating shaft 2 to which the turbine blade wheel 12 is fixed. The variable capacity mechanism 30 has the nozzle ring shaft hole 32*h* through which the turbine blade wheel 12 or the rotating shaft 2 is inserted. The nozzle ring shaft hole 32*h* has the nozzle ring shaft hole inner peripheral surface 32*h*1 on which the protrusion 3*a* of the bearing housing 3 is disposed. The protrusion 3*a* has the protrusion outer peripheral surface 3*a*1 in contact with the nozzle ring shaft hole inner peripheral surface 32*h*1. At least one of the nozzle ring shaft hole inner peripheral surface 32*h*1 and the protrusion outer peripheral surface 3*a*1 of the protrusion 3*a* of the bearing housing 3 is subjected to the processing for increasing the friction coefficient. With this example, it may suppress occurrence of slight relative displacement between the variable capacity mechanism 30 and the bearing housing 3.

The nozzle ring shaft hole inner peripheral surface 32*h*1 may include a high friction surface FS5 processed to increase the friction coefficient. The protrusion outer peripheral surface 3*a*1 may include a high friction surface FS5 processed to increase the friction coefficient. The high friction surface FS5 may include a knurled surface or a blasted surface. The surface roughness of the high friction surface FS5 formed on the nozzle ring shaft hole inner peripheral surface 32*h*1 may be greater than surface roughness of the protrusion outer peripheral surface 3*a*1 where the high friction surface FS5 is not formed. The surface roughness of the high friction surface FS5 formed on the protrusion outer peripheral surface 3*a*1 may be greater than a surface roughness of the disc spring back surface 624 where the high friction surface FS5 is not formed.

Some additional examples are disclosed as follows, with continued reference to the drawings for convenience of description.

An example a turbocharger (1) may include a turbine blade wheel (12), a housing (11) having a flow path (13) through which gas received from an inlet (13) flows and a variable capacity assembly (30) disposed in the housing and configured to receive the gas from the flow path (13) and to guide the gas to the turbine blade wheel (12). The housing (11) may include a housing contact surface (112) that is in contact with the variable capacity assembly (30) in an axial direction (Da) of a rotation axis (AX) of the turbine blade wheel (12). The variable capacity assembly (30) may include an assembly contact surface (322) that is in contact with the housing contact surface (112) in the axial direction (Da). At least one of the housing contact surface (112) and the assembly contact surface (322) may include a high friction surface (FS1).

The turbocharger (1) may include a biasing member (62) configured to apply, to the variable capacity assembly, a biasing force pressing the variable capacity assembly (30) against the housing (11).

In the turbocharger (1), the high friction surface (FS1) is processed to include a knurled surface or a blasted surface.

In the turbocharger (1), the assembly contact surface (322) may include the high friction surface (FS1) and a surface roughness of the high friction surface (FS1) may be greater than a surface roughness of the housing contact surface (112).

In the turbocharger (1), the housing contact surface (112) may include the high friction surface (FS1) and a surface roughness of the high friction surface (FS1) may be greater than a surface roughness of the assembly contact surface (322).

The turbocharger (1) may include a rotating shaft (2) which the turbine blade wheel (12) is fixed, a second housing (3) rotatably supporting the rotating shaft (2) and an annular intermediate member (61) located between the second housing (3) and the variable capacity assembly (30). The variable capacity assembly (30) may include an arrangement hole (32*h*) through which the turbine blade wheel (12) or the rotating shaft (2) is inserted and a second assembly contact surface (327) surrounding the arrangement hole (32*h*). The intermediate member (61) may an intermediate member contact surface (616) in contact with the second assembly contact surface (327). At least one of the second assembly contact surface (327) and the intermediate member contact surface (616) may include a second high friction surface (FS2).

The turbocharger (1) may include a biasing member (62) configured to apply, to the variable capacity assembly, a biasing force pressing the variable capacity assembly (30) against the housing (11). The intermediate member (61) may include a second intermediate member contact surface (617) that faces the second housing (3) and that is in contact with the biasing member (62). The biasing member (62) may include a biasing member contact surface (623) in contact with the second intermediate member contact surface (617). At least one of the second intermediate member contact surface (617) and the biasing member contact surface (623) may include a third high friction surface (FS3).

The turbocharger (1) may include a biasing member (62) configured to apply, to the variable capacity assembly, a biasing force pressing the variable capacity assembly (30) against the housing (11), a rotating shaft (2) which the turbine blade wheel (12) is fixed, a second housing (3) rotatably supporting the rotating shaft (2) and an annular intermediate member (61) located between the second housing (3) and the variable capacity assembly (30). The intermediate member (61) may include an intermediate member contact surface (61*c*) that faces the second housing (3) and that is in contact with the biasing member (62). The biasing member (62) includes a biasing member contact surface (623) in contact with the intermediate member contact surface (61*c*). At least one of the intermediate member contact surface (61*c*) and the biasing member contact surface (623) may include a second high friction surface (FS3).

The turbocharger (1) may include a biasing member (62) configured to apply, to the variable capacity assembly (30), a biasing force pressing the variable capacity assembly (30) against the housing (11), a rotating shaft (2) which the turbine blade wheel is fixed and a second housing (3) rotatably supporting the rotating shaft. The second housing (3) may include a second housing contact surface (115) in contact with the biasing member (62) in the axial direction (Da). The biasing member (62) may include a biasing member contact surface (624) in contact with the second housing contact surface (115). At least one of the second housing contact surface (115) and the biasing member contact surface (624) may include a second high friction surface (FS4).

The turbocharger (1) may include a rotating shaft (2) which the turbine blade wheel (12) is fixed and a second housing (3) rotatably supporting the rotating shaft (2). The variable capacity assembly (30) may include an arrangement hole (32*h*) through which the turbine blade wheel (12) or the rotating shaft (2) is inserted. The second housing (3) may include a second housing shoulder portion (3*a*) fitted into the arrangement hole (32*h*). The arrangement hole (32*h*) may include an inner peripheral surface portion (32*h*1) which faces the second housing shoulder portion (3*a*). The second housing shoulder portion (3*a*) may include a shoulder outer surface (3*a*1) in contact with the inner peripheral surface portion (32*h*1) of the arrangement hole (32*h*). At least one of the inner peripheral surface portion (32*h*1) of the arrangement hole (32*h*) and the shoulder outer surface (3*a*1) may include a second high friction surface (FS5).

An example turbocharger (1) may include a turbine blade wheel (12), a housing (11) including a flow path (13) through which gas received from an inlet (14*s*) flows and a variable capacity assembly (30) disposed in the housing (11) and configured to receive the gas from the flow path (13) and to guide the gas to the turbine blade wheel (12). The housing (11) may include a housing contact surface (112) in contact with the variable capacity assembly (30) in an axial direction (Da) of a rotation axis (AX) of the turbine blade wheel (12). The variable capacity assembly (30) may include an assembly contact surface (322) in contact with the housing contact surface (112) in the axial direction (Da). A non-contact surface (SS1, SS2) that faces an inner peripheral surface (111) of the housing (11) and that is separated from the inner peripheral surface (111) of the housing (11). A surface roughness of at least one of the housing contact surface (112) and the assembly contact surface (322) may be greater than a surface roughness of the non-contact surface (SS1, SS2).

The turbocharger (1) may include a biasing member (62) configured to apply, to the variable capacity assembly (30), a biasing force pressing the variable capacity assembly (30) against the housing.

In the turbocharger (1), at least one of the housing contact surface (112) and the assembly contact surface (322) may include a high friction surface (FS1).

In the turbocharger (1), the variable capacity assembly (30) may include a plurality of nozzle vanes (34) forms a plurality of nozzle flow paths (S) for guiding the gas and a disk-shaped nozzle ring (32) rotatably supporting the nozzle ring (32).

In the turbocharger (1), the nozzle ring (32) may include a sliding surface (SLS) on which the plurality of nozzle vanes (34) may be arranged and slides. The surface roughness of at least one of the housing contact surface (112) and the assembly contact surface (322) may be greater than a surface roughness of the sliding surface (SLS).

In the turbocharger (1), the non-contact surface (SS1,SS2) may include an outer peripheral surface (321) of the nozzle ring (32) that faces the inner peripheral surface (111) of the housing (11).

An example turbocharger (1) may include a turbine blade wheel (12), a turbine housing (11) having a scroll flow path (13), a connection flow path (S) through which a gas passes from the scroll flow path (13) into the turbine blade wheel (12) and a variable capacity assembly (30) configured to adjust a cross-sectional area of the connection flow path (S). The turbine housing (11) may include a housing contact surface (112) that is in contact with the variable capacity assembly (30). The variable capacity assembly (30) may include an assembly contact surface (322) that is in contact with the housing contact surface (112), a non-contact surface (SS1, SS2) that faces and is separated from the inner peripheral surface (111) of the turbine housing (11) and a surface roughness of at least one of the housing contact surface (112) and the assembly contact surface (322) is greater than a surface roughness of the non-contact surface (SS1, SS2).

The turbocharger (1) may include a spring (62) configured to apply, to the variable capacity assembly (30), a biasing force pressing the variable capacity assembly (30) against the turbine housing (11), a rotating shaft (2) which the turbine blade wheel (12) is fixed, a bearing housing (3) rotatably supporting the rotating shaft (2) and an annular intermediate plate (61) located between the bearing housing (3) and the variable capacity assembly (30). The spring (62) may be located between the intermediate plate (61) and the bearing housing (3).

In the turbocharger (1), the variable capacity assembly (30) may include a disk-shaped nozzle ring (32) including a main surface (32*e*) facing the connection flow path (S) and a nozzle vane (34) located on the main surface (32*e*). The nozzle vane (34) may slide on the main surface (32*e*). The surface roughness of at least one of the housing contact surface (112) and the assembly contact surface (322) may be greater than a surface roughness of the main surface (32*e*).

In the turbocharger (1), each of the housing contact surface (112) and the assembly contact surface (322) may include a high friction surface (FS1) processed to increase a friction coefficient.

It is to be understood that not all aspects, advantages and features described herein may necessarily be achieved by, or included in, any one particular example. Indeed, having described and illustrated various examples herein, it should be apparent that other examples may be modified in arrangement and detail.

What is claimed is:

1. A turbocharger comprising:

a turbine blade wheel;

a rotating shaft to which the turbine blade wheel is fixed;

a first housing including a flow path through which gas received from an inlet flows;

a second housing rotatably supporting the rotating shaft;

a variable capacity assembly disposed in the first housing and configured to receive the gas from the flow path and to guide the gas to the turbine blade wheel;

an annular intermediate plate contacting the variable capacity assembly in an axial direction of the rotating shaft; and a biasing member located between the intermediate plate and the second housing, the biasing member configured to apply a biasing force to the intermediate plate so as to press the intermediate plate against the variable capacity assembly, wherein the first housing includes a housing contact surface that is in contact with the variable capacity assembly in the axial direction, wherein the variable capacity assembly includes an assembly contact surface that is in contact with the housing contact surface in the axial direction, wherein the intermediate plate includes:

a first contact surface in contact with the variable capacity assembly in the axial direction; and a second contact surface that is located on a side opposite to the first contact surface in the axial direction, and in contact with the biasing member in the axial direction, wherein each of the first contact surface and the second contact surface includes a high friction surface, and wherein an entire surface of the first contact surface is the high friction surface.

2. The turbocharger according to claim 1, wherein the high friction surface is processed to include a knurled surface or a blasted surface.

3. The turbocharger according to claim 1, wherein the housing contact surface includes a high friction surface, and wherein a surface roughness of the high friction surface of the housing contact surface is greater than a surface roughness of the assembly contact surface.

4. The turbocharger according to claim 1, wherein the variable capacity assembly includes:

an arrangement hole through which the turbine blade wheel or the rotating shaft is inserted; and a second assembly contact surface surrounding the arrangement hole;

wherein the second contact surface of the intermediate plate is in contact with the second assembly contact surface, and wherein the second assembly contact surface includes a second high friction surface.

5. The turbocharger according to claim 1, wherein the biasing member includes a biasing member contact surface in contact with the second contact surface of the intermediate plate, and wherein the biasing member contact surface includes a second high friction surface.

6. The turbocharger according to claim 1, wherein the second housing includes a second housing contact surface in contact with the biasing member in the axial direction, wherein the biasing member includes a biasing member contact surface in contact with the second housing contact surface, and wherein at least one of the second housing contact surface and the biasing member contact surface includes a second high friction surface.

7. The turbocharger according to claim 1, wherein the variable capacity assembly includes an arrangement hole through which the turbine blade wheel or the rotating shaft is inserted, wherein the second housing includes a second housing shoulder portion fitted into the arrangement hole, wherein the arrangement hole includes an inner peripheral surface portion which faces the second housing shoulder portion, wherein the second housing shoulder portion includes a shoulder outer surface in contact with the inner peripheral surface portion of the arrangement hole, and wherein at least one of the inner peripheral surface portion of the arrangement hole and the shoulder outer surface includes a second high friction surface.

8. A turbocharger comprising:

a turbine blade wheel;

a rotating shaft to which the turbine blade wheel is fixed;

a housing including:

a flow path through which gas received from an inlet flows; and a connection flow path through which a gas passes from the flow path into the turbine blade wheel; and a variable capacity assembly disposed in the housing and configured to receive the gas from the flow path and to guide the gas to the turbine blade wheel, the variable capacity assembly including:

a nozzle vane located in the connection flow path;

a nozzle ring rotatably supporting the nozzle vane; and a drive ring rotating the nozzle vane and contacting the nozzle ring, wherein the housing includes a housing contact surface in contact with the variable capacity assembly in an axial direction of the rotating shaft, wherein the nozzle ring includes:

a nozzle ring contact surface in contact with the housing contact surface and located between the housing contact surface and the drive ring in the axial direction; and an outer peripheral surface that faces an inner peripheral surface of the housing and that is separated from the inner peripheral surface of the housing in a radial direction of the rotating shaft, wherein an entire surface of the nozzle ring contact surface has a high friction surface, and wherein a surface roughness of the high friction surface is greater than a surface roughness of the outer peripheral surface of the nozzle ring.

9. The turbocharger according to claim 8, wherein the housing comprises a first housing which accommodates the turbine blade wheel and a second housing that is connected to the first housing and supports the rotating shaft, wherein the nozzle ring is located between the first housing and the second housing, wherein the turbocharger further comprises:

a heat shielding plate located between the first housing and the second housing and contacting the nozzle ring; and a biasing member located between the heat shielding plate and the second housing, the biasing member configured to apply a biasing force to the heat shielding plate so as to press the heat shielding plate against the first housing via the nozzle ring, and wherein the second housing comprises a bottom surface in contact with the biasing member, the bottom surface including a high friction surface.

10. The turbocharger according to claim 8, wherein the nozzle ring includes a sliding surface on which the nozzle vane is arranged and slides, and wherein the surface roughness of the high friction surface is greater than a surface roughness of the sliding surface.

11. The turbocharger according to claim 8, wherein the housing comprises a first housing which accommodates the turbine blade wheel and a second housing that is connected to the first housing and supports the rotating shaft, wherein the nozzle ring is located between the first housing and the second housing, wherein the turbocharger further comprises:

a heat shielding plate located between the first housing and the second housing and contacting the nozzle ring; and a biasing member located between the heat shielding plate and the second housing, the biasing member configured to apply a biasing force to the heat shielding plate so as to press the heat shielding plate against the first housing via the nozzle ring, wherein the heat shielding plate includes:

a first contact surface in contact with the nozzle ring in the axial direction; and a second contact surface which is located on a side opposite to the first contact surface in the axial direction, and is in contact with the biasing member in the axial direction, and wherein each of the first contact surface and the second contact surface includes a high friction surface.

12. A turbocharger comprising:

a turbine blade wheel;

a rotating shaft to which the turbine blade wheel is fixed;

a housing including a connection flow path through which gas passes, wherein the gas flows from the connection flow path into the turbine blade wheel;

a nozzle vane located in the connection flow path;

a nozzle ring rotatably supporting the nozzle vane;

a heat shielding plate located next to the nozzle ring in an axial direction of the rotating shaft; and a biasing member configured to apply a biasing force to the heat shielding plate so as to press the heat shielding plate against the nozzle ring, wherein the heat shielding plate includes:

a first contact surface contacting the nozzle ring in the axial direction; and a second contact surface located on a side opposite to the first contact surface in the axial direction, and contacting the biasing member, wherein each of the first contact surface and the second contact surface includes a high friction surface, and wherein an entire surface of the first contact surface includes the high friction surface.

13. The turbocharger according to claim 12, wherein the high friction surface is processed to include a knurled surface or a blasted surface.

14. The turbocharger according to claim 12, wherein the nozzle ring includes a nozzle ring main surface which faces the connection flow path, and wherein a surface roughness of the high friction surface is greater than a surface roughness of the nozzle ring main surface.

15. A turbocharger comprising:

a turbine blade wheel;

a rotating shaft to which the turbine blade wheel is fixed;

a housing including a connection flow path through which gas passes, wherein the gas flows from the connection flow path into the turbine blade wheel;

a nozzle vane located in the connection flow path;

a nozzle ring rotatably supporting the nozzle vane;

a heat shielding plate located next to the nozzle ring in an axial direction of the rotating shaft; and a biasing member configured to apply a biasing force to the heat shielding plate so as to press the heat shielding plate against the nozzle ring, wherein the heat shielding plate has a ring-shape and comprises:

a first contact surface contacting the nozzle ring in the axial direction;

a second contact surface located on a side opposite to the first contact surface in the axial direction, and contacting the biasing member; and an outer peripheral surface facing the housing, wherein each of the first contact surface and the second contact surface includes a high friction surface, and wherein the high friction surface has a ring shape along the outer peripheral surface of the heat shielding plate.

16. The turbocharger according to claim 12, wherein the housing comprises a turbine housing which accommodates the turbine blade wheel and a bearing housing that is connected to the turbine housing and supports the rotating shaft, wherein the biasing member is located between the nozzle ring and the bearing housing, and wherein the bearing housing comprises a bottom surface in contact with the biasing member, the bottom surface including a high friction surface.

17. The turbocharger according to claim 12, further comprising a drive ring configured to rotate the nozzle vane, wherein the nozzle ring includes:

a nozzle ring main surface which faces the connection flow path;

an outer peripheral surface located around the nozzle ring main surface; and an outer flange which protrudes from the outer peripheral surface in a radial direction of the rotating shaft, the outer flange including:

a first flange surface contacting the housing in the axial direction; and a second flange surface located on a side opposite to the first flange surface in the axial direction and contacting the drive ring in the axial direction, and wherein a surface roughness of the first flange surface is greater than a surface roughness of the second flange surface.

18. The turbocharger according to claim 1, wherein an entire surface of the second contact surface is the high friction surface.

* * * * *